(12) United States Patent
Kojchev et al.

(10) Patent No.: US 12,138,979 B2
(45) Date of Patent: Nov. 12, 2024

(54) VEHICLE SUSPENSION CONTROL SYSTEM

(71) Applicant: JAGUAR LAND ROVER LIMITED, Warwickshire (GB)

(72) Inventors: Stefan Kojchev, Coventry (GB); Robert Neilson, Coventry (GB); James Robertson, Coventry (GB); Phil Guest, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/042,318

(22) PCT Filed: Aug. 19, 2021

(86) PCT No.: PCT/EP2021/073058
§ 371 (c)(1),
(2) Date: Feb. 21, 2023

(87) PCT Pub. No.: WO2022/038231
PCT Pub. Date: Feb. 24, 2022

(65) Prior Publication Data
US 2023/0311606 A1    Oct. 5, 2023

(30) Foreign Application Priority Data

Aug. 21, 2020   (GB) ..................... 2013059

(51) Int. Cl.
*B60G 17/0165*   (2006.01)
*B60G 17/0195*   (2006.01)

(52) U.S. Cl.
CPC ..... *B60G 17/0165* (2013.01); *B60G 17/0195* (2013.01); *B60G 2400/204* (2013.01); *B60G 2400/824* (2013.01)

(58) Field of Classification Search
CPC ............ B60G 17/0165; B60G 17/0195; B60G 2400/204; B60G 2400/824
See application file for complete search history.

(56) References Cited

U.S. PATENT DOCUMENTS 10,315,481 B2 *   6/2019   Lu .................... B60G 17/015
11,285,773 B1 *   3/2022   Hall .................. B60G 17/0161
(Continued)

FOREIGN PATENT DOCUMENTS

| | | |
|---|---|---|
| FR | 3090500 A1 | 6/2020 |
| GB | 2511830 A | 9/2014 |
| WO | 2013004764 A1 | 1/2013 |

OTHER PUBLICATIONS

International Search Report and Written Opinion of the International Searching Authority for International application No. PCT/EP2021/073058 dated Nov. 23, 2021.
(Continued)

*Primary Examiner* — Toan C To
(74) *Attorney, Agent, or Firm* — Carlson, Gaskey & Olds, P.C.

(57) ABSTRACT

A control system (400) is provided for an adjustable suspension of a vehicle (100). The adjustable suspension is operable in at least two different configurations. The control system is configured to receive route data (110) indicative of an expected route of the vehicle, receive map data (120) comprising road type information for a road section of the expected route, and output a switch signal to instruct the adjustable suspension (104) to switch between the two different configurations in dependence on the expected route and the road type information, before the vehicle (100) reaches the road section.

12 Claims, 2 Drawing Sheets

(56) References Cited

U.S. PATENT DOCUMENTS

| | | |
|---|---|---|
| 2005/0090956 A1 | 4/2005 | Ogawa |
| 2017/0129298 A1* | 5/2017 | Lu .................... B60G 17/015 |
| 2017/0217276 A1 | 8/2017 | Banvait et al. |
| 2018/0079272 A1 | 3/2018 | Aikin |
| 2018/0154723 A1* | 6/2018 | Anderson .............. H02K 11/33 |

OTHER PUBLICATIONS

Combined Search and Examination Report under Sections 17 and 18(3) for Application No. GB2013059.7 dated Feb. 16, 2021.
Communication pursuant to Article 94(3) EPC for EP Application No. 21 765 642.0 dated Apr. 2, 2024.

* cited by examiner

VEHICLE SUSPENSION CONTROL SYSTEM

TECHNICAL FIELD

The present disclosure relates to a control system for an adjustable suspension of a vehicle, to an adjustable suspension, and to a vehicle comprising such an adjustable suspension. The present disclosure further relates to a method for controlling an adjustable suspension of a vehicle.

BACKGROUND

Many modern cars have adjustable suspension systems that allow the user to change the driving characteristics of the car in accordance with his or her preferences. These preferences may for example depend on the driver's current mood, road quality or total load of the car in terms of luggage and passengers. Adjusting the suspension will often provide for variation in suspension stiffness. In some configurations, the suspension may provide a more comfortable driving experience. In other configurations, the car may be better suited for a sportier drive style, giving the driver a more direct feel of the road. Adjustment of the suspension system can also result in an effective lowering or raising of the car relative to its wheels and the road surface. On smoother roads and at higher speeds it may, for example, be advantageous to drive in a lowered configuration wherein the frontal area of the car is reduced and the car's energy efficiency is improved.

In some more advanced suspension control systems, the suspension settings may be adapted automatically based on input signals such as vehicle speed or sensor signals from the suspension system, a steering wheel, or a gas pedal. Such automated systems may help the drivers to enjoy the possible benefits of an adjustable suspension system, without having to change any settings manually, thereby allowing them to pay more attention to the actual driving of the car and navigating through traffic. A disadvantage of such automated systems is, however, that they may struggle to promptly respond to changing circumstances. Adjusting the suspension settings takes time as well as energy. Consequently, the automated system cannot instantaneously and continuously react to every change of situation. When the automated adjustment system, based on the incoming sensor signals determines that, for example, the car slows down or the road surface gets rougher, it first has to make sure that this is not just a temporary variation. The resulting delay in may lead to discomfort for the driver.

It is an aim of the present invention to address one or more of the disadvantages associated with prior art.

SUMMARY OF THE INVENTION

Aspects and embodiments of the invention provide a control system for an adjustable suspension of a vehicle, an adjustable suspension and a vehicle comprising such an adjustable suspension. Further aspects and embodiments of the invention provide a method for controlling an adjustable suspension of a vehicle and a non-transitory computer readable medium.

According to an aspect of the present invention there is provided a control system for an adjustable suspension of a vehicle. The adjustable suspension is operable in at least two different configurations. The control system comprises one or more controllers configured to receive route data indicative of an expected route of the vehicle, receive map data comprising road type information for a road section of the expected route, and output a switch signal to instruct the adjustable suspension to switch between the two different configurations in dependence on the expected route and the road type information, before the vehicle reaches the road section.

By taking into account the expected route of the vehicle and the to be expected road type, the control system is capable of predicting the optimal configuration for the vehicle suspension in the near future. This prior knowledge of the road surface that the vehicle will be on allows the control system to start adjusting the configuration of the adjustable suspension already before a new and different road section is reached. This brings the important advantage that the switching between two different configurations can already be fully completed at the moment the car reaches the new road section. On top of that, the control system according to the invention can use its knowledge about the vehicle's expected trajectory and the corresponding road type information to determine when switching to a different suspension configurations will only be of limited benefit because of an upcoming subsequent change of circumstances. In such situations, the control system may now decide that it is not worth adjusting the suspension settings at all.

In an embodiment, the one or more controllers may collectively comprise at least one electronic processor having an electrical input for receiving the route data and the map data; and at least one memory device electrically coupled to the at least one electronic processor and having instructions stored therein, and wherein the at least one electronic processor is configured to access the at least one memory device and execute the instructions thereon so as to output the switch signal to instruct the suspension.

In an embodiment, the two different configurations comprise a first configuration, wherein the adjustable suspension is adapted for driving on a rougher road surface, and a second configuration, wherein the vehicle is configured for reduced drag on a smoother road surface. In the first configuration the suspension may be adapted for more comfortable driving. It is noted that rougher and smoother are relative terms, used only to indicate that the first configuration is provided for use on road sections that are generally more rough than the road sections for which the second configuration is more suitable. However, since the optimal settings may depend on many more factors than just the surface roughness of the road, it is quite well possible that sometimes the first configuration is preferred for a road section where usually the second configuration is more suitable, and vice versa. As an example, reduced drag may be obtained by adjusting the suspension system in such a way as to lower the vehicle body relative to its wheels, and thus the road surface, in order to reduce its frontal area. In a more advanced embodiment, three or more different configurations may be available for a further improved adaptation to different driving conditions and driving styles, while minimising drag. Alternatively, the suspension system may be continuously adaptable in response to the various input parameters and user preferences.

Advantageously, the control system may be configured to estimate a stable stretch and to output the switch signal in dependence on the estimated stable stretch. The estimated stable stretch may, for example, be indicative of a length of road wherein, after an initial switching between the two configurations, the suspension can remain in the switched-to configuration. By making such estimations, it becomes possible to, for example, balance the amount of time and energy needed for switching to a different configuration against the total benefit that may be expected from doing so, before the control system needs to switch back to its original configuration.

In a further embodiment, the control system may be configured to estimate an energy gain resulting from switching between the two different configurations and to instruct the suspension to switch between the two different configurations in dependence on the estimated energy gain. For example, lowering the vehicle position may only lead to substantial energy savings when the vehicle is expected to drive above a certain speed, or when it can do so for a substantial amount of time. The expected energy gain may be balanced against the expected energy expenditure for switching between the different configurations.

Optionally, the control system is configured to receive an expected driving speed of the vehicle when driving on the road section, and to instruct the suspension to switch between the two different configurations in dependence on the expected driving speed. Other information that may be taken into account is, for example, traffic or weather information for the upcoming road section. In addition, information about traffic density and expected delays, traffic information may include information about, for example temporary road closures.

The expected route may, for example, be determined based on a planned route from a navigation system or from historic travel data relating to the vehicle or the user of the vehicle. The navigation system may be built-in into the car or running on a mobile phone of the driver or one of the passengers.

The road type information may comprise all kinds of information that could be relevant for determining the optimal vehicle suspension settings. For example, the road type information may include one or more of a speed limit, an average driving speed, a road quality indicator, and pothole information for the respective road section. Preferably, such more static information is combined with more dynamic information such as current traffic and weather information. For example, traffic information may indicate that the vehicle is likely to be able to drive at the speed limit, or that it will not be possible to drive at the average speed that is normally expected at that road section. Rain, snow, wind and other weather conditions may influence driving conditions and the ideal suspension configuration too.

According to another aspect of the invention an adjustable suspension system for a vehicle is provided that is operable in at least two different configurations and comprises a control system as described above. Further, a vehicle is provided, comprising such a suspension system.

According to another aspect of the invention, a method is provided for controlling an adjustable suspension of a vehicle, the adjustable suspension being operable in at least two different configurations. The method comprises receiving route data indicative of an expected route of the vehicle, receiving map data comprising road type information for a road section of the expected route, and outputting a switch signal to instruct the adjustable suspension to switch between the two different configurations in dependence on the expected route and the road type information, before the vehicle reaches the road section.

A non-transitory computer readable medium is provided, comprising computer readable instructions that, when executed by a processor, cause performance of this method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A control system for a vehicle in accordance with an embodiment of the present invention is described herein with reference to the accompanying figures.

Figure 1:
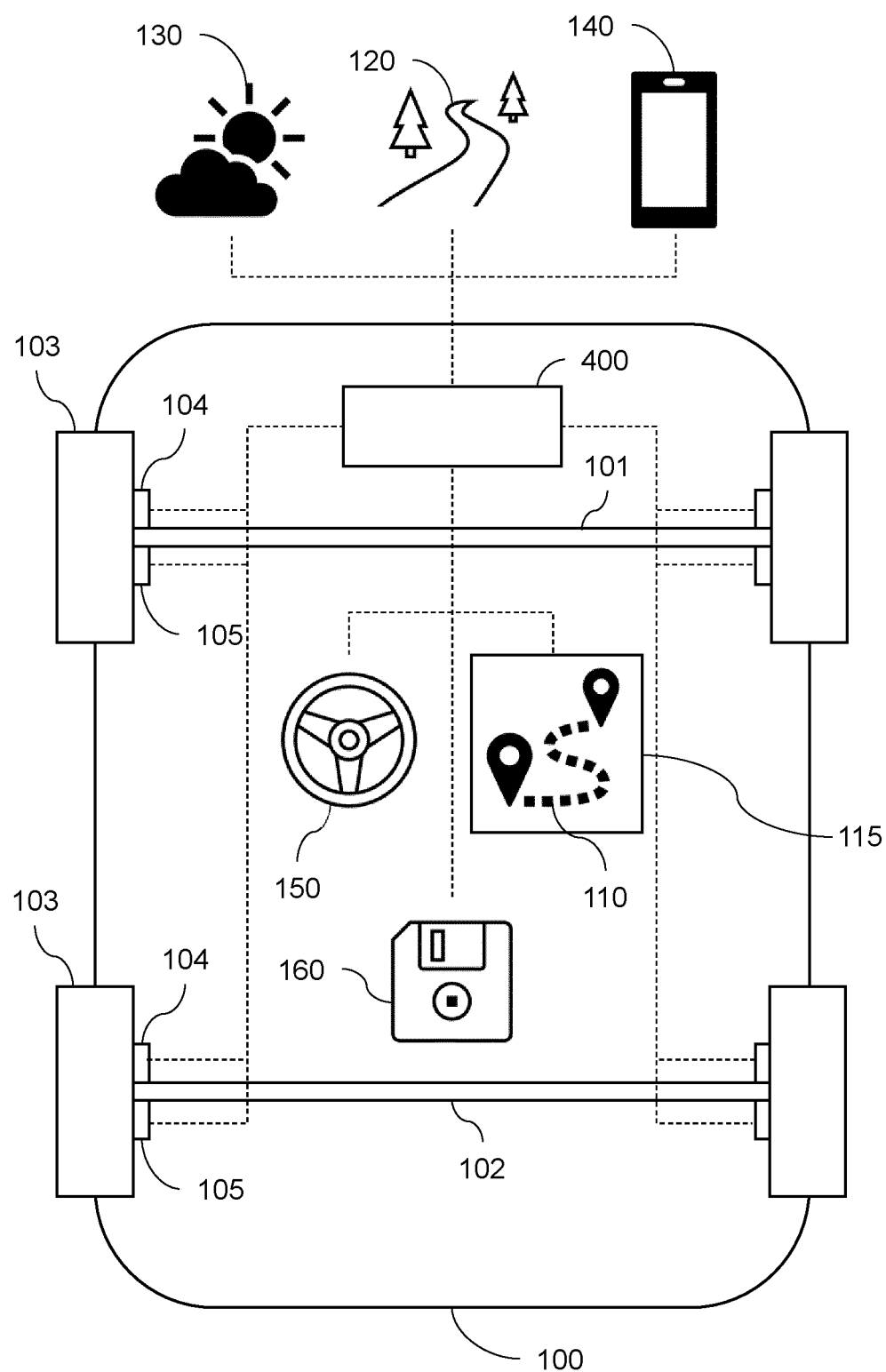
FIG. 1 schematically shows a vehicle with a vehicle suspension control system according to the invention.

FIG. 1 schematically shows a vehicle 100 with a vehicle suspension control system 400 according to the invention. The vehicle 100 has a front axle 101 and a rear axle 102, each supporting a left and a right wheel 103. It is noted that the vehicle 100 shown here is just one example of a practical embodiment in which the control system 400 of the invention can be of benefit. The control system 400 of the invention can be of similar benefit in other vehicles with an adjustable suspension mechanism 104, such as tracked vehicles or vehicles with fewer or more than four wheels. In an embodiment the adjustable suspension system comprises an suspension actuator 104 that is operable to adjust a configuration of the suspension system and a suspension sensor 105 that monitors one or more operational aspects of the suspension system, such as the suspension system configuration, vibrations or forces working on (parts of) the suspension system. The actuator 104 may, for example, be configured to adjust damping characteristics or a stiffness of a suspension spring, a range of movement for the suspension, or a relative position of (parts of) the suspension system relative to the wheel 103 and/or a chassis of the vehicle 100. The actuator 104 may, for example, be a mechanical, a hydraulic or a pneumatic actuator, or use a combination of such technologies. The actuator 104 is electronically controlled by control signals coming from the vehicle suspension control system 400. Sensor signals from the suspension sensors 105 are sent to control system 400.

The vehicle suspension may, for example, be configured in response to user input 150, feedback from the suspension sensors 105, speed sensors, rain sensors, temperature sensors, and real-time data obtained from camera images. While such data can be useful for adapting the suspension configuration to changes in road quality, traffic situation or user preference, it has the disadvantages that the control response may be delayed with respect to the detected change and that energy may be wasted when reacting to changes that later turn out to be very temporary. To further improve the suspension control, the now proposed suspension control system 400 uses predictive information that allows the control system to initiate changes to the configuration of the suspension system, already before the vehicle reaches the different road type, traffic situation or vehicle speed. Thus, any delays resulting from the control system's reaction time or from the time needed to change the configuration of the suspension system are effectively reduced or fully eliminated.

Examples of such predictive information are route data 110 from a built-in route navigation system 115 or from a route navigation system running on the mobile phone 140 of the driver or another passenger. When combined with road type information from a map data source 120, the control system 400 knows what roads the vehicle 100 is going to drive on, when it's going to do so and what road surface to expect there. Based on that information, the control system 400 can then start to adjust the suspension configuration ahead of actually reaching a road section where a different configuration would be useful. This will allow for a smoother transition between different road sections and a more comfortable ride during larger portions of the total ride.

The road type information may comprise all kinds of information that could be relevant for determining the optimal vehicle suspension settings. For example, the road type information may include a speed limit or an average driving speed for similar vehicles on the same road. The road type information may further comprises, for example, a road quality indicator representative of an average smoothness of the road surface and/or of an average or local variability of such smoothness. Pothole information may indicate a number, diameter and/or depth of potholes in the respective road section or in specific parts or lanes of that road sections. Optionally, such road type information may additionally be used by an automated driving assistance system to steer the vehicle 100 to those lanes where the current suspension configuration provides the most comfortable driving experience.

Most of this type of road type information will be off a static nature, but it may be updated regularly to deal with changes that occur over time. The map data may come from an external service provider, for example via a mobile Internet connection. Some or all the data may be stored locally on a local storage medium 160. Such data storage 160 may be shared with or part of the route navigation system 115, which already includes data about where roads are located and some basic information about these roads (for example but not limited to: speed limit; number of lanes and maximum vehicle heights). The data storage 160 may be part of the vehicle 100 itself, or it may be stored on the mobile phone of the driver or one of the passengers.

Optionally, the externally provided data is supplemented with data derived from a vehicle camera or other vehicle sensors to obtain an even more accurate picture of the local road quality. Any road information data obtained by sensors on the vehicle 100 may be uploaded to the external service provider to also keep the externally provided data up to date. The control system 400 may be able to combine data from several data sources. For example, a taxi may make use of the control system 400 based on data stored in his own navigation system and updated by an external service provider. When the taxi drives a passenger to an area where the user has recently driven himself, relevant data from the user's phone may be used to update the road information data stored in the taxi. Alternatively, the passenger data is only used by the taxi for improved suspension control during this one taxi ride.

Preferably, the more static road type information is combined with more dynamic information such as current traffic and weather information 130. For example, traffic information may indicate that the vehicle 100 is likely to be able to drive at the speed limit, or that it will not be possible to drive at the average speed that is normally expected at that road section. Rain, snow, wind, and other weather conditions may influence driving conditions and the ideal suspension configuration too. Traffic and weather information 130 is obtained from an external service provider, for example, via the Internet. The external service provider delivering the traffic and weather information 130 may be the same provider that provides the road type information too, Adjusting the suspension system can be performed in a variety of ways. In some configurations, the suspension may provide a more comfortable driving experience. In other configurations, the vehicle 100 may be better suited for a sportier drive style, giving the driver a more direct feel of the road. Adjustment of the suspension system can also result in an effective lowering or raising of the vehicle 100 relative to its wheels 103 and the road surface. On smoother roads and at higher speeds it may, for example, be advantageous to drive in a lowered configuration wherein the frontal area of the vehicle 100 is reduced and its energy efficiency is improved.

When, for example, driving towards a smooth and empty highway, the control system 400 may start to lower the vehicle 100 already before the vehicle 100 is driving on that highway. However, moving between the lower and the raised configurations takes time and energy. If the road quality is expected to be much lower soon, a traffic jam is near, or the vehicle is expected to leave the highway at the first exit, it may be preferred to not switch to the lowered configuration. In such cases, the possible increase in energy efficiency may not be enough to fully compensate for the energy cost of switching the configuration of the suspension twice (once to lower the vehicle chassis, and once to return to the raised configuration). The control system 400 may thus use its knowledge about the vehicle's expected trajectory and the corresponding road type information to determine when switching to a different suspension configuration will be useful and when it will only be of limited benefit. In such situations of limited or no benefit, the control system 400 may decide not to adjust the suspension settings at all.

To determine whether it will be beneficial to change the suspension configuration, the control system 400 may be configured to estimate a stable stretch. The estimated stable stretch may, for example, be indicative of a length of road wherein, after an initial switching between the two configurations, the suspension can remain in the switched-to configuration. For deciding whether to change the suspension configuration, the stable stretch may be compared to a simple fixed threshold, or a threshold that depends on variables such as the vehicle speed or current wind speeds. Preferably, the control system 400 is further configured to estimate an energy gain resulting from switching between the two different configurations. By making such estimations, it becomes possible to, for example, balance the amount of time and energy needed for switching to a different configuration against the total benefit that may be expected from doing so, before the control system 400 needs to switch back to its original configuration.

Part of the functionality of the suspension control system 400 may be realised remotely. While the actual control of the adjustable suspension system will typically be carried out by an on-board control system, the processing of the input data may be performed by a cloud service. For example, the map data comprising the road type information does not need to reach the actual vehicle 100. The vehicle 100 may submit its route information to the cloud service and receive the appropriate suspension settings in return. Of course, the vehicle's navigation system 115 may rely on a cloud based service too, in which case the on board share of the suspension control system activity may be limited to relaying sensor and camera data to the cloud service and receiving specific instruction for adjusting the suspension system in return.

Figure 2:
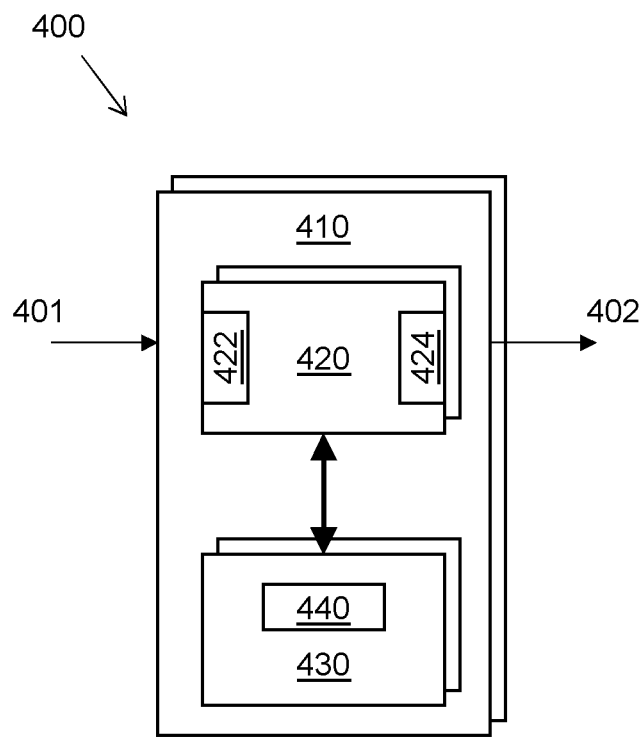
FIG. 2 shows a simplified example of a control system such as may be adapted in accordance with an embodiment of the invention.

FIG. 2 shows a simplified example of a control system 400 such as may be adapted in accordance with an embodiment of the invention. The control system 400 may comprises one or more controllers 410. It is to be understood that the or each controller 410 can comprise a control unit or computational device having one or more electronic processors (for example, a microprocessor, a microcontroller, an application specific integrated circuit (ASIC), etc.), and may comprise a single control unit or computational device, or alternatively different functions of the or each controller 410 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 410 to implement the control techniques described herein (including some or all of the functionality required for the method described herein). The set of instructions could be embedded in said one or more electronic processors of the controller 410; or alternatively, the set of instructions could be provided as software to be executed in the controller 410. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 2, the or each controller 410 comprises at least one electronic processor 420 having one or more electrical input(s) 422 for receiving one or more input signal(s) 401, such as those described above and one or more electrical output(s) 424 for outputting one or more output signal(s) 402, such as a switch signal to instruct the adjustable suspension as described above. The or each controller 410 further comprises at least one memory device 430 electrically coupled to the at least one electronic processor 420 and having instructions 440 stored therein.

The, or each, electronic processor 420 may comprise any suitable electronic processor (for example, a microprocessor, a microcontroller, an ASIC, etc.) that is configured to execute electronic instructions. The, or each, electronic memory device 430 may comprise any suitable memory device and may store a variety of data, information, threshold value(s), lookup tables or other data structures, and/or instructions therein or thereon. In an embodiment, the memory device 430 has information and instructions for software, firmware, programs, algorithms, scripts, applications, etc. stored therein or thereon that may govern all or part of the methodology described herein. The processor, or each, electronic processor 420 may access the memory device 430 and execute and/or use that or those instructions and information to carry out or perform some or all of the functionality and methodology describe herein.

The at least one memory device 430 may comprise a computer-readable storage medium (for example a non-transitory or non-transient storage medium) that may comprise any mechanism for storing information in a form readable by a machine or electronic processors/computational devices, including, without limitation: a magnetic storage medium (for example floppy diskette); optical storage medium (for example CD-ROM); magneto optical storage medium; read only memory (ROM); random access memory (RAM); erasable programmable memory (for example EPROM ad EEPROM); flash memory; or electrical or other types of medium for storing such information/instructions.

Example controllers 410 have been described comprising at least one electronic processor 420 configured to execute electronic instructions stored within at least one memory device 430, which when executed causes the electronic processor(s) 420 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

Figure 3:
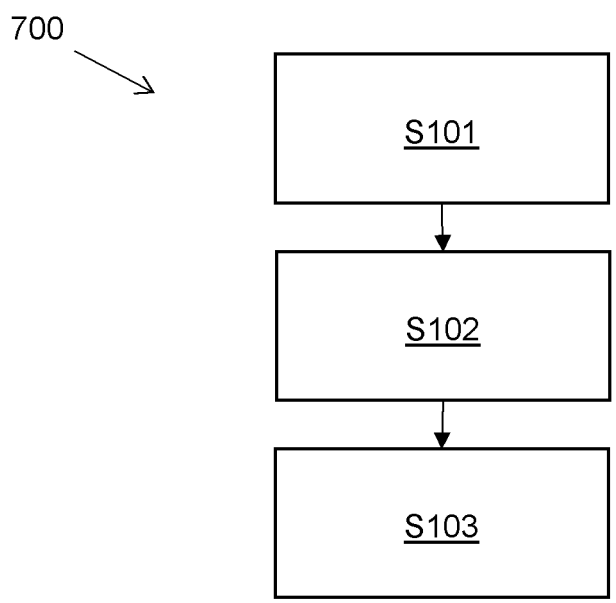
FIG. 3 shows a method in accordance with an embodiment of the invention.

FIG. 3 shows a method 700 in accordance with an embodiment of the invention. In an embodiment of the invention the method, at S101, comprises receiving route data indicative of an expected route of the vehicle. At S102 the method comprises receiving map data comprising road type information for a road section of the expected route. At S103 the method comprises outputting a switch signal to instruct the adjustable suspension to switch between the two different configurations in dependence on the expected route and the road type information, before the vehicle reaches the road section. It will be appreciated that embodiments of the method may comprise execution configurations of the control system described above.

It will be appreciated that various changes and modifications can be made to the present invention without departing from the scope of the present application.

The invention claimed is:

1. The control system for an adjustable suspension of a vehicle, the adjustable suspension being operable in at least two different configurations, the control system comprising one or more controllers configured to:
   receive route data indicative of an expected route of the vehicle;
   receive map data comprising road type information for a road section of the expected route; and
   output a switch signal to instruct the adjustable suspension to switch between the two different configurations in dependence on the expected route and the road type information, before the vehicle reaches the road section,
   wherein the control system is configured to estimate a stable stretch of road indicative of a length of road wherein, after an initial switching between the two configurations, the suspension can remain in the switched-to configuration, and to output the switch signal in dependence on the estimated stable stretch of road.

2. The control system according to claim 1, wherein the two different configurations comprise:
   a first configuration, wherein the adjustable suspension is adapted for driving on a rougher road surface; and a second configuration, wherein the vehicle is configured for reduced drag on a smoother road surface.

3. The control system according to claim 1, configured to determine whether to output the switch signal to instruct the adjustable suspension to switch between the two different configurations in dependence on a comparison of the stable stretch of road to a threshold.

4. The control system according to claim 1, wherein one of the different configurations is a raised configuration and another one of the different configurations is a lower configuration in which the frontal area of the vehicle is less than the frontal area of the vehicle when in the raised configuration, and wherein the control system is configured to estimate an energy gain resulting from switching between the lower and raised configurations and to instruct the suspension to switch between the lower and raised configurations in dependence on the estimated energy gain.

5. The control system according to claim 1, configured to receive at least one of:
   an expected driving speed of the vehicle when driving on the road section;
   traffic information for the road section;
   weather information for the road section;
   a planned route from a navigation system;
   historic travel data relating to the vehicle; and
   historic travel data relating to a user of the vehicle,
and configured to instruct the suspension to switch between the two different configurations in dependence on at least one of:
   the expected driving speed;
   the traffic information;
   the weather information;
   the planned route; and
   the historic travel data.

6. An adjustable suspension system for a vehicle, operable in at least two different configurations, the adjustable suspension comprising the control system as claimed in claim 1.

7. A vehicle comprising the adjustable suspension system as claimed in claim 6.

8. A method of controlling an adjustable suspension of a vehicle, the adjustable suspension being operable in at least two different configurations, the method comprising:

receiving route data indicative of an expected route of the vehicle;
receiving map data comprising road type information for a road section of the expected route; and
outputting a switch signal to instruct the adjustable suspension to switch between the two different configurations in dependence on the expected route and the road type information, before the vehicle reaches the road section;
wherein the method comprises estimating a stable stretch of road indicative of a length of road wherein, after an initial switching between the two configurations, the suspension can remain in the switched-to configuration, and outputting the switch signal in dependence on the estimated stable stretch of road.

9. The method according to claim 8, wherein the two different configurations comprise:
   a first configuration, wherein the adjustable suspension is adapted for driving on a rougher road surface, and
   a second configuration, wherein the vehicle is configured for reduced drag on a smoother road surface.

10. The method according to claim 8, comprising determining whether to output the switch signal to instruct the adjustable suspension to switch between the two different configurations in dependence on a comparison of the stable stretch of road to a threshold.

11. The method according to claim 8, wherein one of the different configurations is a raised configuration and another one of the different configurations is a lower configuration in which the frontal area of the vehicle is less than the frontal area of the vehicle when in the raised configuration, and wherein the method comprises estimating an energy gain resulting from switching between the raised and lowered configurations and wherein outputting the switch signal to instruct the suspension to switch between the raised and lowered configurations is performed in dependence on the estimated energy gain.

12. A non-transitory computer readable medium comprising computer readable instructions that, when executed by a processor, cause the processor to perform the method of claim 8.

* * * * *